US009215602B2

(12) United States Patent
Ferrato et al.

(10) Patent No.: US 9,215,602 B2
(45) Date of Patent: Dec. 15, 2015

(54) SIMULATING A MOBILE NETWORK WITH SHARED ACCESS CHANNELS (75) Inventors: Marco Ferrato, Asti (IT); Daniele Franceschini, Turin (IT); Paolo Goria, Turin (IT); Claudio Guerrini, Turin (IT); Alessandro Trogolo, Turin (IT); Enrico Zucca, Turin (IT); Angela Micocci, Collepasso (IT)

(73) Assignee: Telecom Italia S.p.A., Milan (IT)

( * ) Notice: Subject to any disclaimer, the term of this patent is extended or adjusted under 35 U.S.C. 154(b) by 2656 days.

(21) Appl. No.: 11/667,593

(22) PCT Filed: Nov. 12, 2004

(86) PCT No.: PCT/IB2004/003710
§ 371 (c)(1),
(2), (4) Date: Oct. 11, 2007

(87) PCT Pub. No.: WO2006/051345
PCT Pub. Date: May 18, 2006

(65) Prior Publication Data
US 2008/0161006 A1      Jul. 3, 2008

(51) Int. Cl.
H04W 40/00      (2009.01)
H04W 16/22      (2009.01)
H04L 12/24      (2006.01)
H04W 16/18      (2009.01)

(52) U.S. Cl.
CPC ............. *H04W 16/22* (2013.01); *H04L 41/145* (2013.01); *H04W 16/18* (2013.01)

(58) Field of Classification Search
USPC ............................. 455/447, 450, 452.1, 452.2
See application file for complete search history.

(56) References Cited

U.S. PATENT DOCUMENTS

| 7,181,360 B1* | 2/2007 | Nikolac et al. ................ 702/119 |
| 2002/0004407 A1* | 1/2002 | Simonsson ................... 455/522 |
| 2002/0193106 A1* | 12/2002 | Koo et al. ..................... 455/423 |
| 2003/0086405 A1 | 5/2003 | Silva et al. |

(Continued)

FOREIGN PATENT DOCUMENTS

| WO | WO-02/104055 A1 | 12/2002 |
| WO | WO-03/094538 A2 | 11/2003 |

OTHER PUBLICATIONS

Gill; "A Simulation of a GSM Network With Frequency Hopping"; 1991 Sixth International Conference on Mobile Radio and Personal Communications, Conf. Pul. No. 351, pp. 167-174, (1991).

(Continued)

*Primary Examiner* — Kent Chang
*Assistant Examiner* — Scott Au
(74) *Attorney, Agent, or Firm* — Finnegan, Henderson, Farabow, Garrett & Dunner, L.L.P.

(57) ABSTRACT

A method for simulating a mobile telephone network with shared-access channels. The simulation method includes the steps of simulating at least a first and a second configuration of the mobile telephone network that are statistically independent one from the other. Each one of the steps of simulating includes at least the steps of: determining a number of mobile terminals generating a packet data traffic; assigning to a list of mobile terminals included in the number of mobile terminals generating a packet data traffic, at least one shared-access channel of the mobile telephone network to be simulated; and performing a scheduling management algorithm of the list of mobile terminals on the shared-access channel.

11 Claims, 5 Drawing Sheets

(56) References Cited

U.S. PATENT DOCUMENTS

2004/0111502 A1* 6/2004 Oates .......................... 709/223
2006/0058038 A1* 3/2006 Das et al. .................. 455/456.1

OTHER PUBLICATIONS

Che et al.; "GPRS Radio Network Performance Simulation and Optimization With Dynamic Simulator"; Proceedings of ICCT 2003, pp. 935-939, (2003).

* cited by examiner

SIMULATING A MOBILE NETWORK WITH SHARED ACCESS CHANNELS

CROSS REFERENCE TO RELATED APPLICATION

This application is a national phase application based on PCT/IB2004/003710, filed Nov. 12, 2004, the content of which is incorporated herein by reference.

BACKGROUND OF THE INVENTION

1. Field of the Invention

The present invention refers in general to the field of mobile telephones and in particular to a mobile telephone network. More in particular, the present invention refers to a method and a system for simulating the behaviour of a mobile telephone network, that can provide services through shared-access channels, based for example on the GSM/GPRS (Global System for Mobile Communications/General Packet Radio Service) standard or on the EDGE (Enhanced Data for GSM Evolution) standard or on the HSDPA (High-Speed Downlink Packet Access) standard or on the UMTS (Universal Mobile Telecommunication System) standard.

2. Description of the Related Art

Planning of a network requires the designers to evaluate performances of a network based on geographic data, on network configurations and on expected service requests. The tools that simulate the operation of a network provide a practical method for planning the network itself. The network planning tools allow the designers to simulate the operation of various network configurations by performing modifications on the network based on statistical data obtained as simulation output.

Currently-available cellular network planning tools are generally based on simulators of the static type or of the dynamic type.

In static simulations, the time variable is not taken into account, but the network is analysed in a particular state, as if it were analysed through a photograph. By carrying out many network analyses (many "photographs" called "snapshots") in different states, it is possible to obtain a global network evaluation.

A static simulation of a GSM network is described, for example, in T. M. Gill "A simulation of a GSM network with frequency hopping", 1991 Sixth International Conference on Mobile Radio and Personal Communications (Conf. Pul. No. 351) p. 167-74.

In dynamic simulations, the time variable is instead taken into account and the subsequent changes of the network state are regulated by "events"; each "event" represents the realisation of a condition that determines the change of the network state. By carrying out a simulation that takes into account the network state evolution for a certain time length, it is possible to obtain a global network evaluation.

In WO 02/104055, in the name of the Applicant itself, a dynamic simulation system is for example disclosed, characterised by a modular structure based on interchangeable objects that are able to be selectively activated, which comprises a simulation engine and a plurality of modules representative of apparatuses and elements of the network to be simulated. Due to such structure, the system allows simulating highly complex networks.

Dynamic simulators are also used for simulating the mobile telephone networks with shared-access channels (such as for example the GPRS network). The shared-access channels are physical channels, generally used for packet data transmission, which can be shared among many users. For example, the shared-access channels can be used when the packet data transmission is of the intermittent type (such as the download of a Web page) or when a mobile terminal uses a service of the Best-Effort type, namely a service for which the mobile telephone operator cannot guarantee a high quality level. Suitable algorithms, so-called scheduling algorithms, which are part of the set of procedures/algorithms for managing radio resources (Radio Resource Management or RRM) in a mobile telephone network, schedule, in time, the sharing of a single physical channel among different users.

Dynamic simulators, taking into account the time variable, are able to simulate the behaviour of the mobile telephone networks with shared-access channels. In particular, the use of dynamic simulators allows evaluating the effect/impact of scheduling algorithms on performances of this type of networks.

SUMMARY OF THE INVENTION

The Applicant has however observed that the use of dynamic simulators implies rather high simulation times if compared with simulation times obtained by using static simulators, above all when networks to be simulated are big-sized and with high complexity.

The Applicant therefore posed itself the problem of making a static simulator that is able to simulate a mobile telephone network with shared-access channels with adequate accuracy and reliability, though without taking into account the time variable.

The invention solves the above-stated technical problem by introducing, in a static simulator, a module that is able to simulate the management of user scheduling on the shared-access channels of the mobile telephone network to be simulated.

According to the present invention, during each analysis ("photograph or snapshot") of the mobile telephone network to be simulated, the module that manages the user scheduling in turn enables all (or a substantial portion of) the users, that generate a packet data traffic, to transmit/receive on at least one of the shared-access channels being present in the network itself. At the end of the simulation, the mean throughput can be calculated, namely the mean of information transferred, per time unit, from each mobile terminal onto the shared-access channels on which it has been enabled to transmit/receive during the simulation.

The Applicant has observed that the above-stated problem can be solved by a method for simulating a mobile telephone network with shared-access channels comprising at least the steps of:
  simulating a first configuration of said mobile telephone network;
  simulating a second configuration of said mobile telephone network;
said first and second configuration of said mobile telephone network being statistically independent one from the other;
each one of said steps of simulating comprising at least the steps of:
  determining a number of mobile terminals generating a packet data traffic;
  assigning to a list of mobile terminals, included in said number of mobile terminals generating a packet data traffic, at least one shared-access channel of said mobile telephone network to be simulated; and
  executing a scheduling management algorithm of said list of mobile terminals on said shared-access channel.

Another aspect of the present invention refers to a system for simulating at least a first and a second configuration of a mobile telephone network, said first and second configuration of said mobile telephone network being statistically independent one from the other and each comprising a number of mobile terminals to be simulated generating a packet data traffic, said simulating system including:

at least one object representing a network controller belonging to said mobile telephone network; said at least one object comprising modules configured for:

assigning to a list of mobile terminals, included in said number of mobile terminals generating a packet data traffic, at least one shared-access channel of said mobile telephone network to be simulated; and executing a scheduling management algorithm of said list of mobile terminals on said shared-access channel.

A further aspect of the present invention refers to a computer program product that can be loaded in the memory of at least one electronic processor and comprising portions of software code for performing the process according to the invention when the product is executed on a processor: in this context such statement must be deemed wholly equivalent to the mention of means that can be read by a computer comprising instructions for checking a network of computers in order to perform a process according to the invention. The reference to "at least one electronic processor" is obviously aimed to enlighten the chance of performing the arrangement according to the invention in a de-centralised context.

Further preferred aspects of the present invention are described in the dependent claims and in the present description.

BRIEF DESCRIPTION OF THE DRAWINGS

The characteristics and the advantages of the present invention will appear from the herein below description of an embodiment thereof, provided merely as a non-limiting example, with reference to the enclosed drawings, in which.

DETAILED DESCRIPTION OF THE INVENTION

Figure 1:
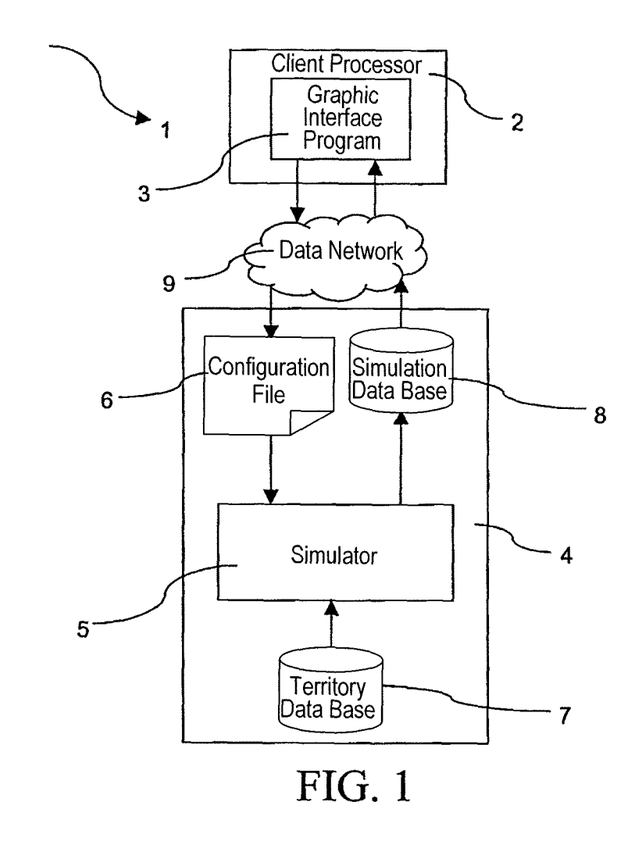
FIG. 1 shows a client-server architecture through which the simulation method according to the invention operates.

With reference to FIG. 1, the method for simulating a mobile telephone network, providing services through shared-access channels according to the invention, can operate through a client-server architecture 1, of a known type, described below. As a non-limiting example, the mobile telephone network which will be referred to in the following description is a mobile telephone network of the GSM/GPRS type (herein below called "GSM/GPRS network"). However the simulation method according to the invention can be applied also to mobile telephone networks based for example on the EDGE or HSDPA or UMTS standards.

Moreover, the following description will define as GSM mobile terminals all mobile terminals that are able to generate a voice-type traffic and as GPRS mobile terminals all mobile terminals that are able to generate a packet data traffic. In particular, the packet data traffic generated by the GPRS mobile terminals can be, for example:

a continuous traffic from/to the GPRS mobile terminal, for example a file transfer using a FTP (File Transfer Protocol) protocol;

a traffic of the WWW (World Wide Web) type, namely the downloading of Web pages as packets representing the various objects forming each Web page.

Always with reference to FIG. 1, the client-server architecture 1 comprises: a client processor 2, for example a Personal Computer, on which a graphic interface program 3, of a known type, is installed; a server processor 4, for example a Work Station, on which a simulator 5, of the static type, is installed, for simulating the GSM/GPRS network.

Specifically, the simulator 5 receives as input:

a configuration file 6 comprising a set of network configuration parameters, listed in the following description, describing the characteristics of the GSM/GPRS network. Network configuration parameters are defined by the mobile telephone operator by using the graphic interface program 3;

a structured set of territory data extracted from a territory data base 7. This set of territory data can comprise data regarding: expected traffic, height, morphology, buildings on each territory element (pixel) forming the area in which the GSM/GPRS network will be planned;

and provides as output:

a set of statistical data, listed herein below in the description, describing the performance of the GSM/GPRS network. These statistical data are then stored, in a structured way, in a simulation data base 8 and afterwards are sent to the graphic interface program 3 that displays them.

As shown in FIG. 1, client processor 2 and server processor 4 are mutually interconnected through a data network 9, of a known type, based for example on a protocol of the TCP/IP type. Alternatively, client processor 2 and server processor 4 can be a single processor.

The network configuration parameters included in the configuration file 6 can for example comprise:

the number of cells including in the GSM/GPRS network;

the geographic position of the cells themselves;

the number of transceiver stations (Base Transceiver Station or BTS) being present in the network;

the indication, for each transceiver station BTS, of the cells associated therewith;

the characteristics of each transceiver station BTS, such as for example: antenna gain, radiation diagram; maximum radiation direction (defined in terms of azimuth and tilt); noise digit of receivers included in each transceiver station BTS; antenna connection losses; transmission powers associated with common channels;

characteristics of mobile terminals to be simulated, such as for example noise figure of the receiver included in each GSM/GPRS mobile terminal, gain and losses associated with the terminal antenna, maximum transmission power available for the uplink connection (namely the communication occurring from mobile terminal to transceiver station), power dynamics of the mobile terminal; and control parameters for radio resources managing procedures/algorithms, comprising, for example: number of radio resources that can be assigned to GSM mobile terminals and number of radio resources that can be assigned to GPRS mobile terminals.

Moreover, the statistical data obtained as output from the simulator 5 and stored in the simulation data base 8 can, for example, comprise:

mean throughput for each GPRS mobile terminal, namely the mean of information transferred per time unit from each GPRS mobile terminal onto the shared-access channels assigned thereto during the simulation; and mean value of signal/noise ratio measured from each GPRS mobile terminal onto the shared-access channels assigned thereto during the simulation.

For each shared-access channel, the signal/noise ratio measured from the GPRS mobile terminal corresponds to the ratio between power associated with data packets that the mobile terminal is receiving on such channel and the remaining power received by the mobile terminal on the same channel.

Figure 2:
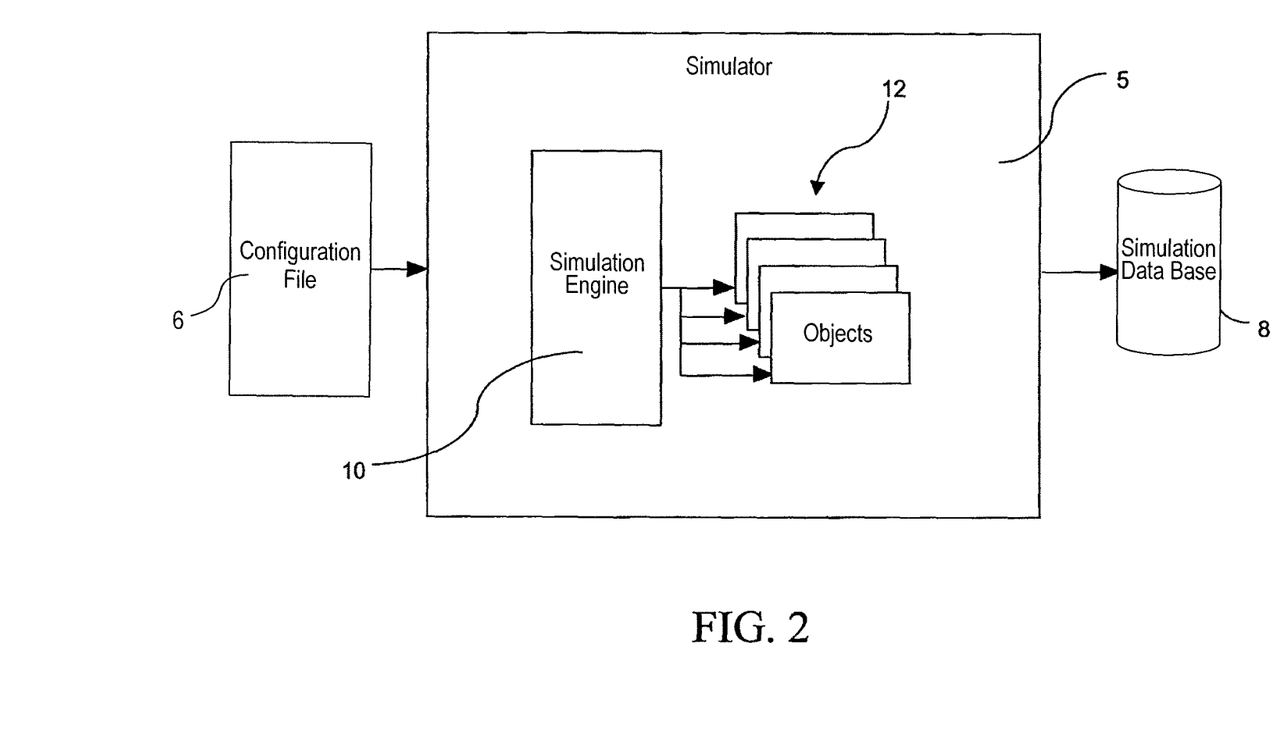
FIG. 2 shows an exemplified structure of a simulator made according to the invention.

With reference to FIG. 2, the simulator 5, implemented for example in ANSI C++ programming language by means of a project platform of the UML ("Unified Modelling Language") type, comprises, according to a so-called object-oriented approach:

a simulation engine 10, providing for management and evolution of the simulation; and a plurality of objects, designated by reference number 12, each one representing a physical device of the GSM/GPRS network, as better described in the following description.

According to the object-oriented approach, the elementary decomposition unit is not the operation (procedure), but the object, represented as an aggregation of variables, data structures and procedures which are considered a single entity by the simulator. In the examined case, the simulation objects correspond, in general, to real entity models (real world objects).

Moreover, it can be noted that, during the simulation, each simulation object directly interacts with the remaining objects, by sending information elements called "messages". Specifically, the communication through messages is characterised in that the reception of information by the destination object occurs simultaneously with the transmission by the source object.

Figure 3:
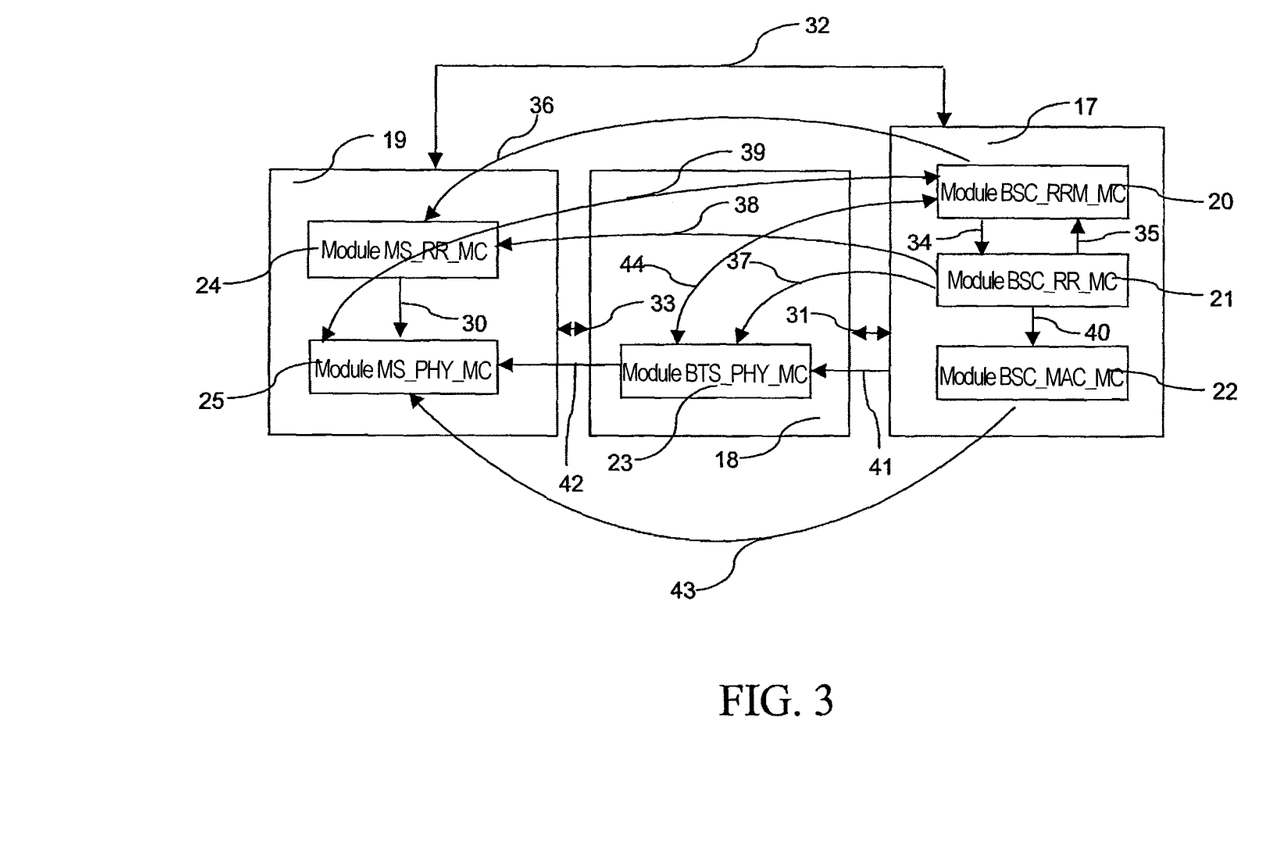
FIG. 3 shows simulation objects used by the simulator in FIG. 2.

With reference to FIG. 3, the plurality of objects 12 can comprise:

at least one object of the BSC_MC type, designated by reference number 17, comprising at least three modules BSC_RRM_MC 20, BSC_RR_MC 21 and BSC-MAC_MC 22, shown in more detail in the following description, simulating the behaviour of a Network Controller ("Base Station Controller"). Within a mobile telephone network, the Network Controllers manage radio resources and control the radio transport;

a plurality of objects of the BTS_MC type, each one designated by reference number 18, simulating the behaviour of transceiver stations BTS of the GSM/GPRS network. Each object 18 of the BTS_MC type comprises at least one module BTS_PHY_MC 23, shown in more detail in the following description; and a plurality of objects of the MS_MC type, each one designated by reference number 19, simulating the behaviour of the mobile terminals of the GSM/GPRS network. Each object of the MS_MC 19 type comprises at least two modules MS_RR_MC 24 and MS_PHY_MC 25, shown in more detail in the following description. In a preferred embodiment, each object 19 of the MS_MC type can be of the GSM type, namely it can simulate the behaviour of a GSM mobile terminal or can be of the GPRS type, namely it can simulate the behaviour of a GPRS mobile terminal.

More in detail:

module BSC_RRM_MC 20, included in object 17 of the BSC_MC type, simulates the assignment of radio resources for calls related to objects 19 of the MS_MC type. In a preferred embodiment of the present invention, module BSC_RRM_MC 20 receives from module BSC_RR_MC 21 a request message for assigning radio resources for each object 19 of the MS_MC type, processes such request and sends a message to module BSC_RR_MC 21 for assigning radio resources to each object 19 of the MS_MC type for which a request has been made;

module BSC_RR_MC 21, included in object 17 of the BSC_MC type, simulates the configuration of each one of modules BSC_MAC_MC 22, BTS_PHY_MC 23 and MS_RR_MC 24, respectively included in object 17 of the BSC_MC type and in each object 18 of the BST_MC type and each object 19 of the MS_MC type, and activation/deactivation of calls related to objects 19 of the MS_MC type. According to a preferred embodiment of the present invention, module BSC_RR_MC 21 sends to each one of modules BSC_MAC_MC 22, BTS_PHY_MC 23 and MS_RR_MC 24 a configuration message, so that these modules appropriately use radio resources assigned thereto by module BSC_RRM_MC 20. Moreover, module BSC_RR_MC 21 sends to each one of modules BSC_MAC_MC 22, BTS_PHY_MC 23 and MS_RR_MC 24 a message containing indications about activation/deactivation of calls related to objects 19 of the MS_MC type, for example indications dealing with beginning and end of activation of calls;

module BSC_MAC_MC 22, included in object 17 of the BSC_MC type, according to the present invention, simulates the scheduling management ("scheduling algorithm") of objects 19 of the MS_MC type, simulating the behaviour of GPRS mobile terminals, on the shared-access channels of the GSM/GPRS network;

module BTS_PHY_MC 23, included in each object 18 of the BTS_MC type, simulates the physical level of the transceiver station BTS of the GSM/GPRS network and comprises a plurality of objects of the cell type, not shown in FIG. 2;

module MS_RR_MC 24, included in each object 19 of the MS_MC type, simulates the configuration of radio resources assigned to GSM and GPRS mobile terminals by module BSC_RRM_MC 20 and the management of activation/deactivation of calls for each of the above mobile terminals. As already previously illustrated, module MS_RR_MC 24 receives from module BSC_RR_MC 21 a configuration message for radio resources and a message containing indications about activation/deactivation of calls. In turn, module MS_RR_MC 24 sends these messages to module MS_PHY_MC 25, included in each object 17 of the MS_MC type, in order to correctly set such module 8 (arrow 30 in FIG. 3); and module MS_PHY_MC 25 simulates the physical level of GSM and GPRS mobile terminals.

Figure 4:
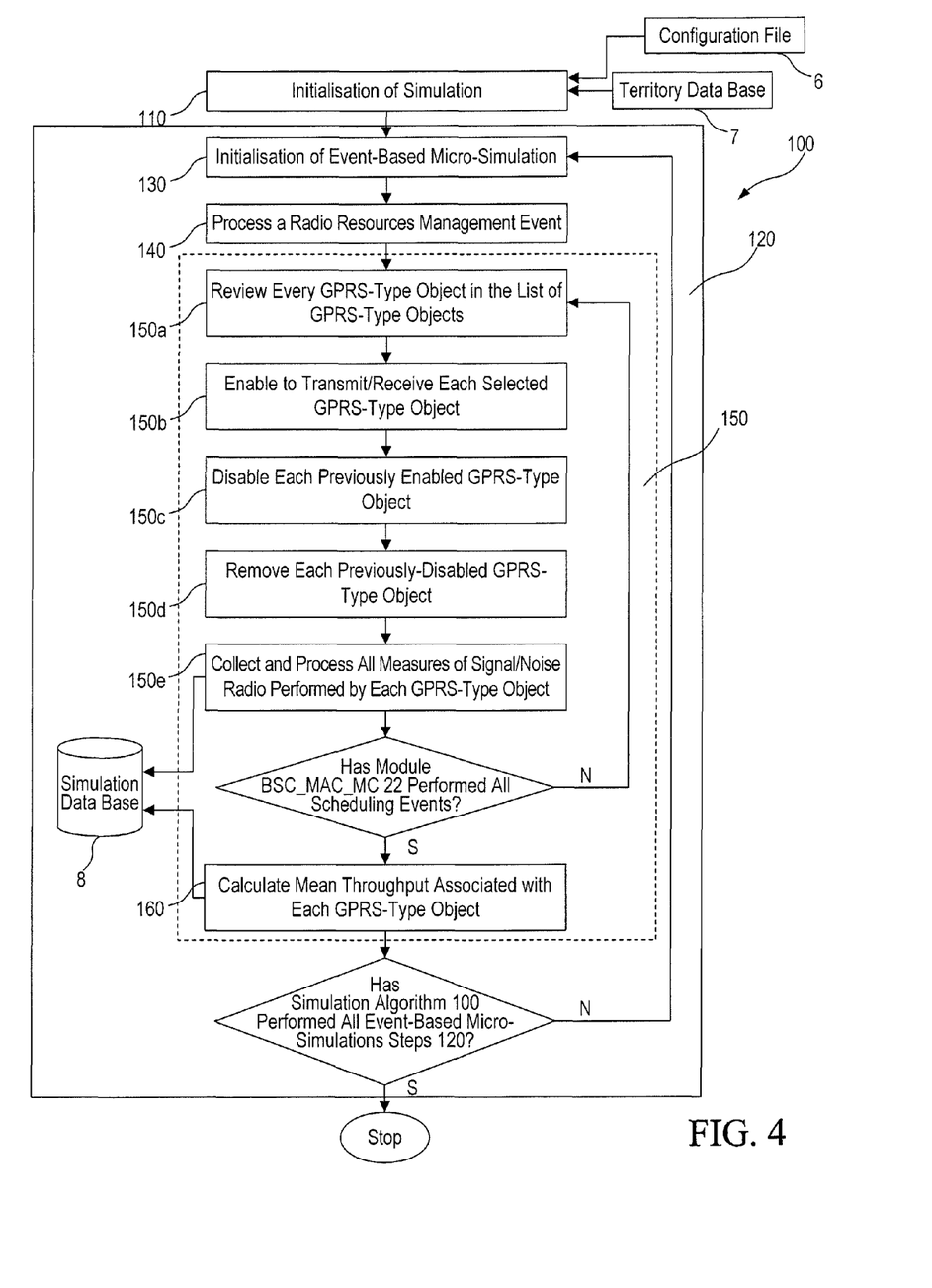
FIGS. 4 and 5 show flow diagrams related to the simulation method according to the invention.

The simulation method according to the invention will now be described with reference to FIG. 3 and to the flow diagram shown in FIG. 4. In detail, the flow diagram in FIG. 4 shows a simulation algorithm 100 that operates according to the invention.

It can be stated that the evolution of the simulation algorithm 100 depends on the simulation engine 10 that controls the sequence of simulation steps included in the algorithm itself.

In detail, the simulation algorithm 100 according to the invention can comprise a step of initialisation of the simulation 110 and one or more iterative steps of event-based micro-simulation 120.

In each event-based micro-simulation step 120, a network configuration is simulated (in terms of mobile terminals distribution), and all network configurations simulated during the simulation are statistically independent one from the other.

In the following description and claims, the term "statistically independent" means that two network configurations simulated in two following event-based micro-simulations are not the temporal evolution one of the other.

In detail, the step of initialisation of the simulation 110 can comprise the following steps performed by the simulation engine 10:

reading the parameters included in the configuration file 6;

creating the simulation objects depending on network configuration parameters read from the configuration file 6. More specifically, the simulation engine 10 instantiates the objects 17 of the BSC_MC type, the objects 18 of the BTS_MC type and the objects 19 of the MS_MC;

bi-directionally connecting the simulation objects, as indicated in the configuration file 6: in particular the bi-directional connection allows a simulation object to be able to interact with another simulation object and vice versa. More specifically, the simulation engine 10 connects objects 17 of the BSC_MC type with objects 18 of the BTS_MC type and objects 19 of the MS_MC type (arrows 31 and 32 in FIG. 3) and objects 19 of the MS_MC type with objects 18 of the BTS_MC type (arrow 33 in FIG. 3); and initialising objects 17 of the BSC_MC type, objects 18 of the BTS_MC type and objects 19 of the MS_MC type so that they are configured in an initial state.

Always with reference to FIG. 4, each event-based micro-simulation 120 step can comprise the following steps, performed by the simulation engine 10:

a step of initialisation of the event-based micro-simulation 130;

a first step of processing a radio resources management event 140 in which a traffic distribution of the voice type, realised by objects 19 of the MS_MC type simulating the behaviour of the GSM mobile terminals, is analysed; and a second step of processing a radio resources management event 150 in which a traffic distribution of the packet data type, realised by objects 19 of the MS_MC type simulating the behaviour of the GPRS mobile terminals, is analysed.

More specifically, the step of initialising the event-based micro-simulation 130 can comprise the following steps, performed by objects 17 of the BSC_MC type, objects 18 of the BTS_MC type and objects 19 of the MS_MC type:

configuring the common channels, namely the channels that are used for activation/deactivation of calls related to objects 19 of the MS_MC type. In particular, module BSC_RRM_MC 20, included in object 17 of the BSC_MC type, configures the common channels for the cells controlled by each object 18 of the BTS_MC type; for each cell and each channel, module BSC_RRM_MC 20 sets a value of transmitted power calculated based on the configuration file 6; the minimum set of common configured channels comprises at least channel BCCH ("Broadcast Control CHannel) and channel CCCH ("Common Control CHannel").

calculating one's own position by each object 19 of the MS_MC type that, for example, randomly extracts it within the area in which the GSM/GPRS network will be planned;

calculating by module MS_RR_MC 24, included in each object of the MS_MC type, the value of SAF (Service Activity Factor) parameter, for example by randomly extracting a value included between 0 and 1 for such parameter. In particular, the SAF parameter represents the activity probability associated with each GSM and GPRS mobile terminal for a certain simulated traffic distribution;

calculating by module MS_RR_MC 24, included in each object 19 of the MS_MC type simulating the behaviour of a GPRS mobile terminal, the TBC (Total Block Count) parameter, for example by randomly extracting a value included between 0 and 1 for such parameter. In particular, the TBC parameter represents the amount of packet data traffic that each GPRS mobile terminal can generate during the simulation;

managing the camping: each object 19 of the MS_MC type determines which common BCCH channel receives with the higher signal level;

recording in module BSC_RR_MC 21, included in object 17 of the BSC_MC type, all modules MS_RR_MC 24 included in each object 19 of the MS_MC type whose calculated SAF value is, for example, lower than a threshold (SAF_THRESHOLD) read in the configuration file 6. The total number of objects 19 of the MS_MC type that take part in each step of event-based micro-simulation 120 can be calculated, in a known way, by using data contained in the territory data base 7. Moreover, in the configuration file 6 the total number of objects 19 of the MS_MC type is divided into objects 19 of the MS_MC type 19 simulating the behaviour of the GSM mobile terminals and objects 19 of the MS_MC type simulating the behaviour of the GPRS mobile terminals. Module BSC_RR_MC 21 records modules MS_RR_MC 24 by dividing them, according to what is established in the configuration file 6, into: modules MS_RR_MC 24 included in objects 19 of the MS_MC type simulating the behaviour of the GSM mobile terminals and modules MS_RR_MC 24 included in objects 19 of the MS_MC type simulating the behaviour of the GPRS mobile terminals;

sending to module BSC_RRM_MC 20, by module BSC_RR_MC 21, a request for radio resources related to each module MS_RR_MC 24 recorded by module BSC_RR_MC 21 (arrow 34 in FIG. 3);

sending by module BSC_RRM_MC 20 a message for assigning radio resources to each module MS_RR_MC 24 recorded by module BSC_RR_MC 21 (arrow 35 in FIG. 3); if there are no more radio resources available, module BSC_RRM_MC 20 sends a message for refusing the assignment of radio resources to the remaining modules MS_RR_MC 24;

sending by module BSC_RR_MC 21 a configuration message, for each assignment message received in the previous step, to modules MS_RR_MC 24 so that they use the radio resources assigned thereto by module BSC_RRM_MC 20 (arrow 36 in FIG. 3); in this way, module BSC_RR_MC 21 performs the configuration of channels assigned to objects 19 of the MS_MC type simulating the behaviour of the GSM mobile terminals (dedicated-access channels, namely channels reserved to a single mobile terminal) and of channels assigned to objects 19 of the MS_MC type simulating the behaviour of the GPRS mobile terminals (shared-access channels, namely channels used by one or more mobile terminals);

sending by module BSC_RR_MC 21 a configuration message of the starting power to modules BTS_PHY_MC 23, associated with cells in which there are objects 19 of the MS_MC type simulating the behaviour of the GSM mobile terminals, and to modules MS_RR_MC 24 included in such objects (arrows 37 and 38 in FIG. 3).

Moreover, the first step of processing a radio resources management event 140 comprises at least a step of processing a power control event, performed by objects 19 of the MS_MC type simulating the behaviour of the GSM mobile terminals (defined herein below as "GSM-type objects"). During such step, the GSM-type objects transmit/receive on dedicated-access channels assigned thereto by module BCS_RRM_MC 20 and, simultaneously, through the respective modules MS_PHY_MC 25, perform measures on such channels, for example of the RXLEV parameter representing the level of received power and the RXQUAL parameter representing the quality level of the received service. Correspondingly, modules BTS_PHY_MC 23 perform, on the same channels, the measures of RXLEV and RXQUAL parameters received by them. These parameters are useful to obtain, at the end of the step of processing the power control event, the update of its own transmission power by each GSM-type object and each module BTS_PHY_MC 23.

In a preferred embodiment, the updated of its own transmission power by each GSM-type object and each module BTS_PHY_MC 23 can provide for the cyclic repetition, for a number of times established in the configuration file 6, of the following steps:
sending to module BSC_RRM_MC 20 by modules MS_PHY_MC 25 a report message containing the measured values of RXLEL and RXQUAL parameters (arrow 39 in FIG. 3);
sending to module BSC_RRM_MC 20 by modules BTS_PHY_MC 23 a report message containing the measured values of RXLEL and RXQUAL parameters (arrow 44 in FIG. 3);
processing by module BSC_RRM_MC 20 the measured values of RXLEL and RXQUAL parameters contained in the report message to calculate the new transmission power of modules MS_PHY_MC 25 and modules BTS_PHY_MC 23;
sending by module BSC_RRM_MC 20 a configuration message of the new transmission power value to modules MS_PHY_MC 25 (arrow 39 in FIG. 3);
sending by module BSC_RRM_MC 20 a configuration message of the new transmission power value to modules BTS_PHY_MC 23 (arrow 44 in FIG. 3);
updating by modules MS_PHY_MC 25 their own transmission power depending on the received configuration message of module BSC_RRM_MC 20; and
updating by modules BTS_PHY_MC 23 their own transmission power depending on the received configuration message of module BSC_RRM_MC 20.

The second step of processing a radio resources management event 150 provides for the simulation of a scheduling management algorithm of objects 19 of the MS_MC type simulating the behaviour of the GPRS mobile terminals (defined herein below as "GPRS-type objects") on the shared-access channels of the GSM/GPRS network.

In a preferred embodiment of the present invention, the simulated scheduling management algorithm uses a time division mode for managing the scheduling. In this mode, time is divided into elementary units (for example 20 ms long) called block periods: for each block period, the scheduling management algorithm assigns to at least one mobile terminal at least one shared-access channel: such mobile terminal is then enabled to transmit on such channel during such block period.

Specifically, the scheduling management algorithm is simulated through module BSC_MAC_MC 22, included in object 17 of the BSC_MC type, that during the second step of processing a radio resources management event 150, performs one or more scheduling events (each simulating one block period) as will be better described in the following description.

More in detail, the second step of processing a radio resources management event 150 starts when module BSC_RR_MC 21 sends to module BSC_MAC_MC 22 a configuration message (arrow 40 in FIG. 3) containing at least the following elements:
number (NumRBslot) of scheduling events to be performed;
time length of each scheduling event, for example 20 ms (this parameter is contained in the configuration file 6); and
list of GPRS-type objects to which radio resources have been assigned in transmission/reception for the current step of event-based micro-simulation 120. This list is divided into one or more sub-lists, each one comprising the number of GPRS-type objects that, for the current step of event-based micro-simulation 120, are assigned to each shared-access channel included in the GSM/GPRS network; such list is determined depending on the assignment of radio resources performed by module BSC_RRM_MC 20 during each step of initialisation of the event-based micro-simulation 130, by counting, for each shared-access channel how many GPRS-type objects received such channel as assignment; and
starting power to be assigned to modules BTS_PHY_MC 23 included in each object 18 of the BTS_MC type, associated with cells in which there are objects 19 of the MS_MC type simulating the behaviour of the GPRS mobile terminals (arrow 41 in FIG. 3).

Module BSC_MAC_MC 22, through the simulation engine 10, performs the NumRBslot scheduling events provided in the configuration message sent by module BSC_RR_MC 21, with a timing that, for example, is 20 ms. During each scheduling event, module BSC_MAC_MC 22 performs the following operations:
reviews (150a) every GPRS-type object belonging to the list of GPRS-type objects with radio resources assigned in transmission/reception for the current step of event-based micro-simulation 120 and, for each sub-list, and therefore for each shared-access channel, selects the GPRS-type object occupying the first place of the related sub-list, keeping memory of the latest selected GPRS-type object in the sub-list itself;
enables (150b) to transmission/reception, on the respective shared-access channel, each GPRS-type object selected in the previous step (arrows 42 and 43 in FIG. 3). Under this condition, each GPRS-type object can transmit/receive on at least one shared-access channel assigned thereto simultaneously performing measures about the signal/noise ratio being present in that channel;
disables (150c) each previously-enabled GPRS-type object, once this latter one has performed the respective measures of signal/noise ratio on the shared-access channels assigned thereto;
removes (150d) each previously-disabled GPRS-type object from the first position of the respective sub-list, inserting it at the bottom of the sub-list itself. In this way, the GPRS-type objects that will be enabled to transmission/reception in the scheduling event to be simulated are those that in the just simulated scheduling event occupied the second position of the respective sub-list, and so on for all following scheduling events to be simulated.

The operation proceeds similarly to what is described above for each one of the NumRBslot scheduling events provided in the configuration message sent by module BSC_RR_MC 21 to module BSC_MAC_MC 22 at the beginning of the second step of processing a radio resources management event 150.

At the end of each scheduling event, a step for collecting and processing 150*e* all measures of signal/noise ratio performed by each GPRS-type object, is also provided. During this step, the mean signal/noise ratio measured by each GPRS-type object is also calculated. All mean signal/noise ratios calculated in the step of collecting and processing 150*e* are then stored in the simulation data base 8.

Now the simulation engine 10 verifies whether the module BSC_MAC_MC 22 has performed all scheduling events provided in the configuration message sent by module BSC_R-R_MC 21. If the check has a positive result, the simulation engine 10 ends the second step of processing a radio resources management event 150 and, in a preferred embodiment of the present invention, controls the execution of a step for calculating 160 the mean throughput associated with each GPRS-type object. If instead, the check has a negative result, the simulation engine 10 controls the execution of a new scheduling event.

In particular, the mean throughput is calculated depending on the formula:

$$T_{MS} = \sum_{i=1}^{N_{TS}} \frac{T_{TS,i} * N_{RB,TX}}{numRBslot}$$

where $T_{TS,i}$ is the mean throughput related to the i-th shared-access channel assigned to the GPRS-type object (this value is calculated by using curves, set in the configuration file 6, that, for each shared-access channel assigned to the GPRS-type object during the step of executing the event-based micro-simulation 140, link the values of mean signal/noise ratio to the values of mean throughput); $N_{RB,TX}$ is the number of scheduling events in which the GPRS-type object has been enabled to transmission/reception by module BSC_MAC_MC 22; numRBslot is the number of scheduling events performed by module BSC_MAC_MC 22; $N_{TS}$ is the number of shared-access channels assigned to the GPRS-type object during the second step of processing a radio resources management event 150. All values of mean throughput calculated during the step of calculating 160 are then stored in the simulation data base 8.

Now the simulation engine 10 verifies whether the simulation algorithm 100 has performed all event-based micro-simulations steps 120 provided in the configuration file 6. If the check has a positive result, the simulation engine 10 ends the simulation algorithm 100 (stop), otherwise it controls the execution of a new event-based micro-simulation step 120.

Figure 5:
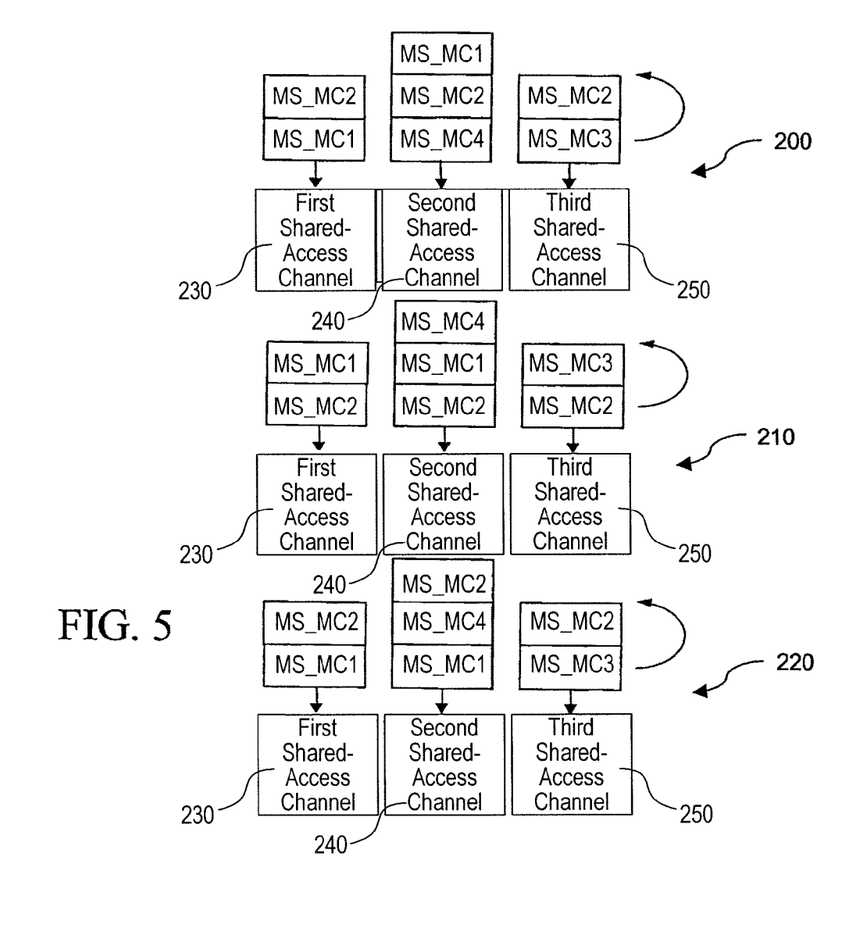

In FIG. 5 an operating example of module BSC_MAC_MC 22 is shown. In particular, in the example in FIG. 5 a first 200, a second 210 and a third 220 scheduling event are simulated in succession regarding four GPRS-type objects (MS_MC1, MS_MC2, MS_MC3, MS_MC4) on a first 230, a second 240 and a third 250 shared-access channel for the uplink connection (namely for the communication occurring from mobile terminal to transceiver station).

As shown in FIG. 5, the sub-list of GPRS-type objects (MS_MC1, MS_MC2) is assigned to the first shared-access channel 230; the sub-list of GPRS-type objects (MS_MC1, MS_MC2, MS_MC4) is assigned to the second shared-access channel 240; the sub-list of GPRS-type objects (MS_MC2, MS_MC3) is assigned to the third shared-access channel 250.

During the first scheduling event 200, module BSC_MAC_MC 22 selects on each shared-access channel 230, 240, 250, the GPRS-type object that occupies the first position of the sub-list assigned to such channel, namely: the GPRS-type object (MS_MC1) is selected on the first shared-access channel 230, the GPRS-type object (MS_MC4) is selected on the second shared-access channel 240, the GPRS-type object (MS_MC3) is selected on the third shared-access channel 250.

After having selected the GPRS-type objects MS_MC1, MS_MC4, MS_MC3, occupying the first place of the respective sub-list, module BSC_MAC_MC 22 enables them for receiving on the shared-access channel assigned thereto, namely: the GPRS-type object (MS_MC1) is enabled for receiving on the first shared-access channel 230, the GPRS-type object (MS_MC4) is enabled for receiving on the second shared-access channel 240, the GPRS-type object (MS_MC3) is enabled for receiving on the third shared-access channel 250.

After each GPRS-type object (MS_MC1, MS_MC4, MS_MC3) enabled for receiving has performed the respective measures of signal/noise ratio, module BSC_MAC_MC 22 disables it and removes it from the first position of the respective sub-list in order to insert it at the bottom of the sub-list itself. In this way, the following is obtained: the first position of the sub-list assigned to the first shared-access channel 230 is now occupied by the GPRS-type object (MS_MC2) while the GPRS-type object (MS_MC1) is at the bottom of the sub-list; the first position of the sub-list assigned to the second shared-access channel 240 is also occupied by the GPRS-type object (MS_MC2), while object MS_MC4 is at the bottom of the sub-list; the first position of the sub-list assigned to the third shared-access channel 250 is also occupied by the GPRS-type object (MS_MC2) while the GPRS-type object (MS_MC3) is at the bottom of the sub-list.

Now, module BSC_MAC_MC 22 performs the second scheduling event 210 in which it selects on each shared-access channel 230, 240, 250, the GPRS-type object that now occupies the first position of the sub-list assigned to such channel. In this case on all three shared-access channels 230, 240, 250, the GPRS-type object (MS_MC2) is selected.

After the GPRS-type object (MS_MC2) has been selected, module BSC_MAC_MC 22 enables it for receiving on the shared-access channels 230, 240, 250 and, after the GPRS-type object (MS_MC2) has performed the respective measures of signal/noise ratio, module BSC_MAC_MC 22 disables it and removes it from the first position of each sub-list in order to insert it at the bottom of the sub-list itself. In this way, the following is obtained: the first position of the sub-list assigned to the first shared-access channel 230 is now occupied again by the GPRS-type object (MS_MC1) while the GPRS-type object (MS_MC2) is at the bottom of the sub-list; the first position of the sub-list assigned to the second shared-access channel 240 is now occupied by the GPRS-type object (MS_MC1), while the GPRS-type object (MS_MC2) is at the bottom of the sub-list; the first position of the sub-list assigned to the third shared-access channel 250 is again occupied by the GPRS-type object (MS_MC3) while the GPRS-type object (MS_MC2) is at the bottom of the sub-list.

Now, module BSC_MAC_MC 22 performs the third scheduling event 220, in which it selects on each shared-access channel 230, 240, 250, the GPRS-type object that now occupies the first position of the sub-list assigned to such channel, namely: the GPRS-type object (MS_MC1) is selected on the first and on the second shared-access channel 230, 240, while the (MS_MC3)-type object is again selected on the third shared-access channel 250.

After having selected the GPRS-type objects MS_MC1, MS_MC3, occupying the first place of the respective sub-list, module BSC_MAC_MC 22 enables them for receiving on the shared-access channel assigned thereto, namely: the GPRS-type object (MS_MC1) is enabled for receiving on the first and the second shared-access channel 230, 240, while the (MS_MC3)-type object is again enabled for receiving on the third shared-access channel 250. Then, module BSC_MAC_MC 22 ends the scheduling events simulation.

Advantageously, the simulation method according to the invention allows to simulate, with adequate accuracy and reliability, the scheduling management procedures/algorithms used in mobile telephone networks with shared-access channels without taking into account the time variable and thereby minimising the required times for simulation.

It is finally clear that numerous modifications and variations, all falling within the inventive concept, as defined by the enclosed claims, can be made to the simulation method and its related simulator, herein described and shown.

The simulator 5 can for example be made using any type of computer (Intel, SUN, Apple, etc.) and operating system (Windows, Linux, Unix, MAC OS, etc.).

Moreover, the use of ANSI C++ programming language for implementing the simulator 5 is only one possible choice; the simulator 5 can be implemented also using other programming languages, such as for example Java, Delphi, Visual Basic, etc. The choice of the ANSI C++ language has been dictated by the good programming flexibility offered by said programming language and by the high level of performance that can be obtained in the finished program in terms of execution speed.

Moreover, the simulator 5 according to the invention can be used also for simulating other types of mobile telephone networks in which there are shared-access channels. In such case it is necessary to provide for the insertion of a module similar to the third module BSC_MAC_MC 22 that has been described previously, that takes care of managing the scheduling of mobile terminals, which generate a packet data traffic on the shared-access channels. For example, it is possible to simulate the UMTS-FDD (Universal Mobile Telecommunications System—Frequency Division Duplex) mobile telephone network by taking into account the DSCH (Downlink Shared CHannel) channels, or the HS-DSCH (High Speed Downlink Shared CHannel) network, or also the EDGE (Enhanced Data rate for Global Evolution) network.

A further advantage of the simulator 5 is given by the chance of using some of the results provided by a simulator of the dynamic type or provided by measures performed on the real network, in order to calculate, for example, the number of GPRS-type objects to be simulated, according to the type of traffic that has to be taken into account.

As already previously mentioned, the simulator 5 can also be used for simulating GPRS mobile terminals generating a data traffic that is different from a data traffic of the FTP (File Transfer Protocol) type. For example, the simulator 5 can also be used for simulating GPRS mobile terminals generating a packet data traffic of the WWW (World Wide Web) type. In this case, the number of GPRS-type objects generating a packet data traffic of the WWW type that can be simulated through the simulator 5 can be computed by taking into account, for example, the following factors:

the characteristics of the traffic of the WWW type to be simulated, such as for example the mean number of packets forming each WWW page to be downloaded, the mean number of WWW pages forming an Internet session, the speed with which data are transmitted by the Web server from which the pages must be downloaded;

the mean downloading time of a single object of a WWW page in a network similar to the one that has to be simulated, obtained for example from a simulator of the dynamic type that has simulated this network or from measures performed on the real network;

the probability of allocating GPRS-type objects on shared-access channels not used by other GPRS-type objects.

Such probability value must be used for obtaining the mean number of shared-access channels to be simulated, and is calculated by taking into account the following factors:

parameters related to the shared-access channels assigning algorithm, such as for example: maximum number of GPRS-type objects that can be assigned for each shared-access channel, number of shared-access channels used by each GPRS-type object for packet data transmission;

characteristics of the WWW traffic to be taken into account, such as for example: mean size of packets, mean size of WWW pages packet header, mean number of packets per WWW page;

mean downloading time of a single object of a WWW page in a network similar to the one that has to be simulated, obtained, for example, as described previously, from measures performed on the real network or from a simulator of the dynamic type used for simulating the network that is similar to the network that has to be simulated; and constants characterising the scenario to be simulated, such as, for example, mean traffic per cell; such quantities are obtained, for example, from a simulator of the dynamic type that has simulated a network similar to the one that has to be simulated or from measures performed on the real network.

The invention claimed is:

1. A method, implemented using at least one computer including at least one processor configured to execute instructions, for simulating a mobile telephone network with shared-access channels, the method comprising at least the steps of:

simulating, using the at least one processor, a first configuration of said mobile telephone network;

simulating, using the at least one processor, a second configuration of said mobile telephone network;

said first and second configurations of said mobile telephone network being statistically independent one from the other;

each one of said steps of simulating comprising at least the steps of:

determining, using the at least one processor, a number of mobile terminals generating a packet data traffic;

assigning, using the at least one processor, to a list of mobile terminals in said number of mobile terminals generating the packet data traffic, at least one shared-access channel of said mobile telephone network to be simulated; and performing, using the at least one processor, a scheduling management process of said list of mobile terminals on said shared-access channel.

2. The method according to claim 1, wherein said step of performing the scheduling management process comprises the step of:

enabling, using the at least one processor, in succession the mobile terminals in said list of mobile terminals for transmitting/receiving on said shared-access channel.

3. The method according to claim 2, wherein said step of enabling in succession the mobile terminals in said list of mobile terminals, comprises the steps of:
- selecting, using the at least one processor, a first mobile terminal on said list of mobile terminals, said first mobile terminal occupying a first position on said list of mobile terminals;
- enabling, using the at least one processor, said first mobile terminal for transmitting/receiving on said shared-access channel;
- moving, using the at least one processor, said first mobile terminal from said first position on said list of mobile terminals to a last position on said list of mobile terminals;
- selecting, using the at least one processor, a second mobile terminal on said list of mobile terminals, said second mobile terminal occupying said first position on said list of mobile terminals;
- enabling, using the at least one processor, said second mobile terminal for transmitting/receiving on said shared-access channel;
- moving, using the at least one processor, said second mobile terminal from said first position on said list of mobile terminals to a last position on said list of mobile terminals; and
- repeating, using the at least one processor, the previous steps for each mobile terminal on said list of mobile terminals.

4. The method according to claim 3, wherein said steps of moving said first and second mobile terminal from said first position on said list of mobile terminals comprises the step of:
- disabling, using the at least one processor, said first and second mobile terminal from transmitting/receiving on said shared-access channel.

5. The method according to claim 1, wherein said packet data traffic is of the continuous type.

6. The method according to claim 1, wherein said packet data traffic is of the world wide web type.

7. The method according to claim 1, wherein said scheduling management process is based on a time division mode.

8. The method according to claim 1, wherein each one of said steps of simulating a configuration of said mobile telephone network further comprises the steps of:
- determining, using the at least one processor, a number of mobile terminals generating voice traffic; and
- processing, using the at least one processor, at least one radio resources management event related to a voice traffic distribution associated with said number of mobile terminals generating the voice traffic.

9. The method according to claim 8, wherein said radio resources management event is a power control event.

10. A system for simulating at least a first and a second configuration of a mobile telephone network, said first and second configuration of said mobile telephone network being statistically independent one from the other and each comprising a number of mobile terminals to be simulated generating a packet data traffic, the system for simulating comprising:
- at least one computer including at least one processor configured to execute computer-executable instructions;
- at least one memory loaded with the computer-executable instructions for performing a simulation process program,
- wherein the simulation process program includes at least one object representing a network controller belonging to said mobile telephone network;
- said at least one object comprising modules configured for:
  - simulating, using the at least one processor, a first configuration of the mobile telephone network;
  - simulating, using the at least one processor, a second configuration of the mobile telephone network;
  - the first and second configuration of the mobile telephone network being statistically independent one from the other;
  - assigning, using the at least one processor, to a list of mobile terminals in said number of mobile terminals generating the packet data traffic, at least one shared-access channel of said mobile telephone network to be simulated; and
  - performing, using the at least one processor, a scheduling managing process of said list of mobile terminals on said shared-access channel.

11. A non-transitory computer-readable storage medium loaded with a computer program, when executed by a processor, performs the steps of the method according to claim 1.

* * * * *